F. H. VAN HOUTEN, Jr.
DOUGH DIVIDING MACHINE.
APPLICATION FILED NOV. 3, 1911.
1,028,406.
Patented June 4, 1912.
2 SHEETS—SHEET 1.
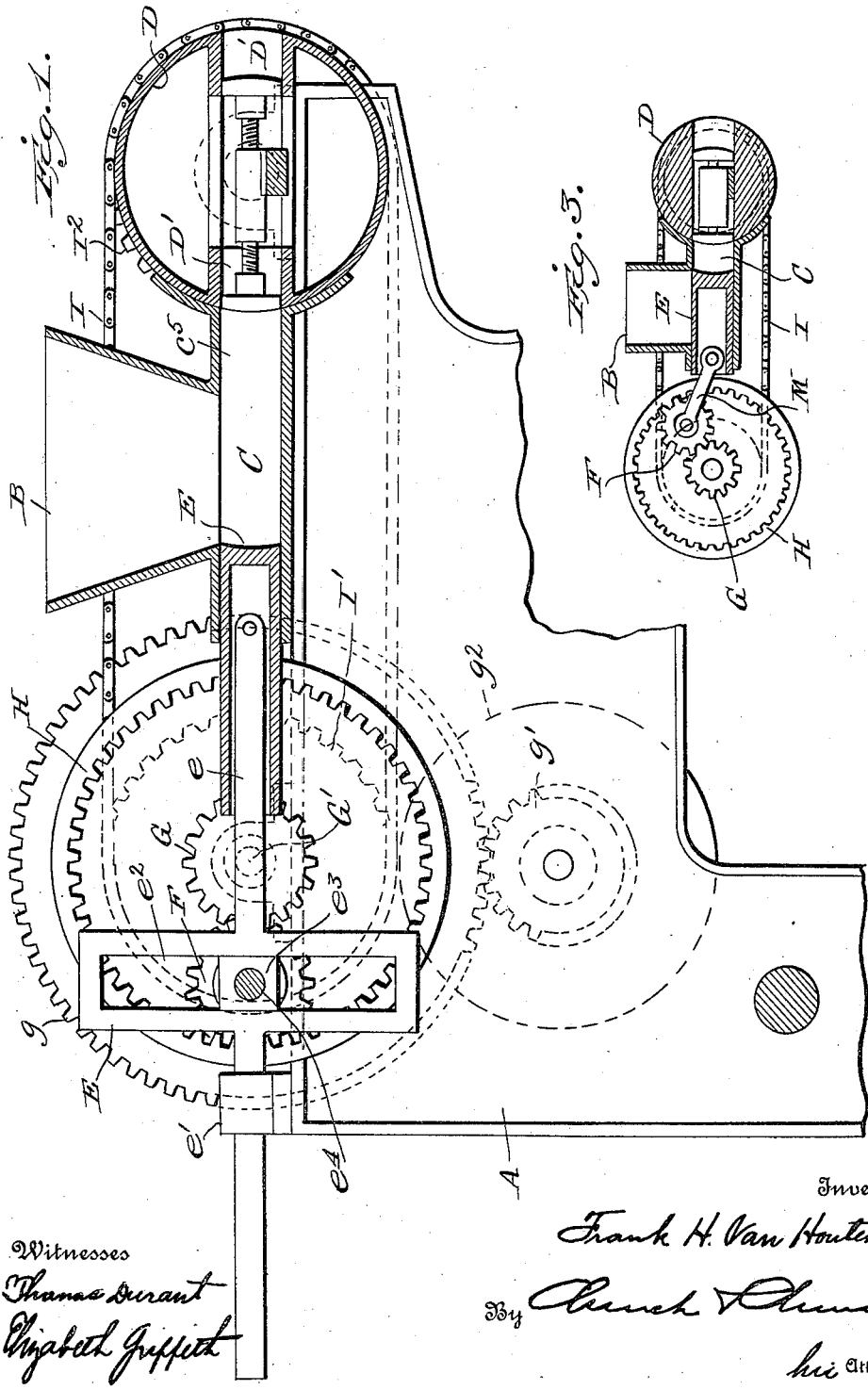

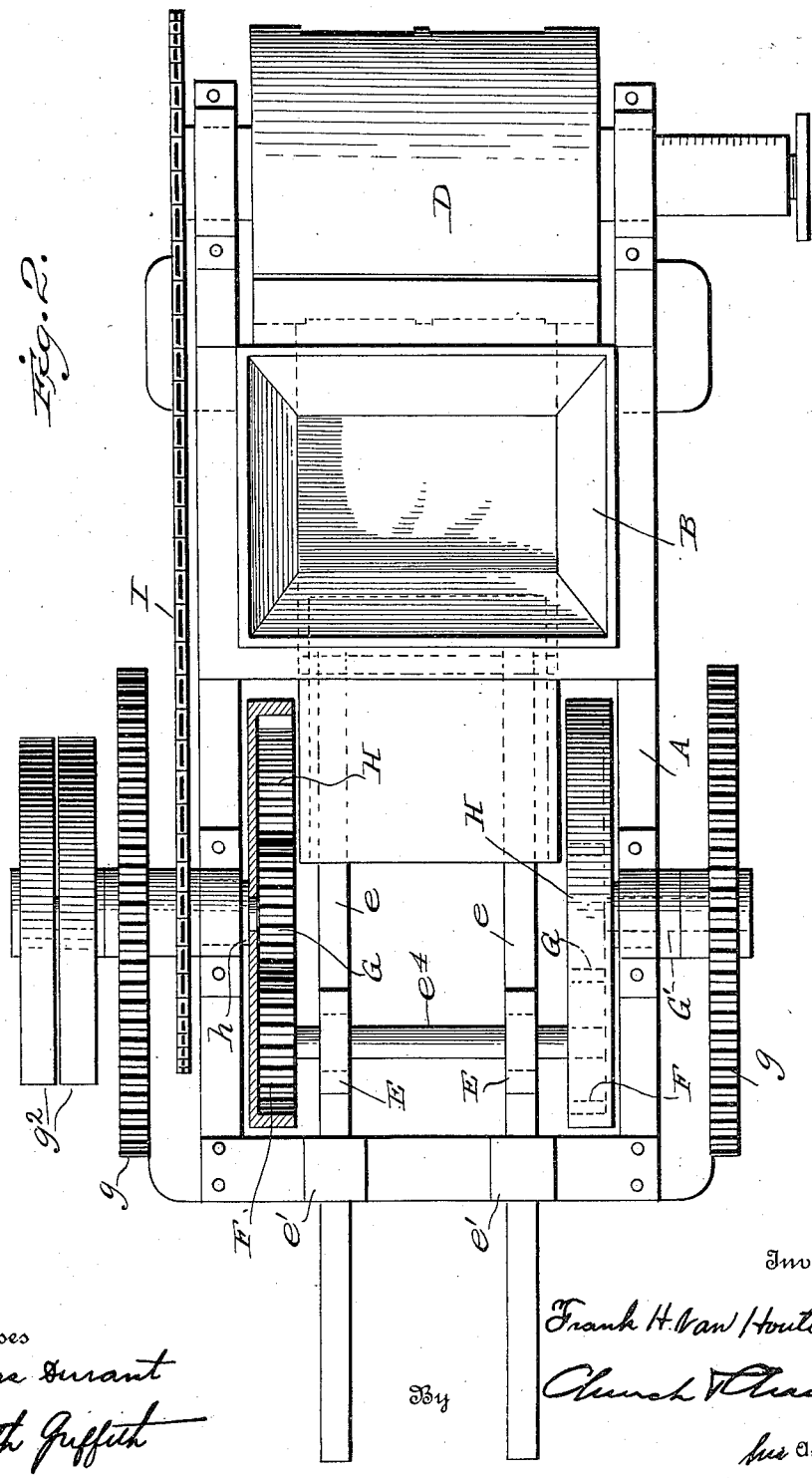

UNITED STATES PATENT OFFICE.

FRANK H. VAN HOUTEN, JR., OF FISHKILL-ON-THE-HUDSON, NEW YORK, ASSIGNOR TO DUTCHESS TOOL COMPANY, OF FISHKILL-ON-THE-HUDSON, NEW YORK, A CORPORATION OF NEW YORK.

DOUGH-DIVIDING MACHINE.

1,028,406.      Specification of Letters Patent.      Patented June 4, 1912.

Application filed November 3, 1911. Serial No. 658,376.

*To all whom it may concern:*

Be it known that I, FRANK H. VAN HOUTEN, Jr., a citizen of the United States, residing at Fishkill-on-the-Hudson, in the county of Dutchess and State of New York, have invented certain new and useful Improvements in Dough-Dividing Machines; and I do hereby declare the following to be a full, clear, and exact description of the same, reference being had to the accompanying drawings, forming part of this specification, and to the figures and letters of reference marked thereon.

This invention relates to improvements in apparatus for giving a uniform density to plastic materials, such as dough, and dividing it into parts of uniform weight, a type of such machine being illustrated in Patent No. 788,123, dated April 25, 1905.

The primary object of the invention is to provide a machine in which the movements of the measuring head and the plunger or mechanism for feeding dough to the measuring head will be correlated and interdependent whereby when a quantity of dough has been advanced by the feeding mechanism it will be held under compression and the head operated until the whole amount has been measured, and when no dough is in position to enter the measuring head, the head will remain at rest and the feeding mechanism caused to operate to advance a new batch.

A further object of the invention is to provide a machine with which the manipulation or working of the dough in its passage through the machine may be reduced, another object being to provide a machine of simple construction which will be practically automatic in its operation and which will overcome the necessity of providing heavy weights or their equivalent for maintaining the pressure on the dough as it is fed to the measuring head.

To these ends the invention consists in certain novel details of construction and combinations and arrangements of parts all as will be now described and the particular features of novelty pointed out in the appended claims.

In the accompanying drawings, wherein is illustrated the preferred embodiment of the invention,—Figure 1 is a longitudinal sectional view of a machine embodying the present improvements; Fig. 2 is a top plan view of the machine; and Fig. 3 is a diagrammatic view illustrative of the operation of the machine.

Similar letters of reference in the several figures indicate the same parts.

Referring to the drawings, the letter A indicates the main frame of the machine, B a hopper, beneath which is a channel C for receiving the dough and having a neck or extension $c^5$, D a cylindrical rotary head carrying measuring pockets D' registering with the neck $c^5$ of the channel C, and each provided with adjusting means for adjusting its capacity, all as described in Patent No. 788,123, above referred to.

Working within the channel C is a plunger or head E adapted to be reciprocated through the medium of connecting rods $e$ connected to the plunger on opposite sides of the machine and extending rearwardly through guides $e'$ on the frame. The connecting rods $e$ are each formed or provided intermediate their ends with yokes E' extending at right angles to the line of movement of the rods and each provided with a slot or opening $e^2$. Working in the slots $e^2$ in the yokes E' are blocks $e^3$ forming bearings for a shaft or rod $e^4$ carrying at each end a gear wheel F, which gear wheels constitute the planet wheels of an epicyclic gearing and are interposed between the driving central or sun gears G and the internally toothed gear H which drives the measuring head as will be presently explained. The central gear wheels G are on the inner ends of shafts G', which at their outer ends carry relatively large gear wheels $g$ adapted to mesh with pinions $g'$ on a drive shaft to which the power is belted by pulleys $g^2$. The outer internally toothed gear wheels H have hubs $h$ journaled in the frame and the shafts G' take their bearings in the hubs $h$ so as to preserve the concentric arrangement preferred in gearing of this kind. The measuring head or cylinder is driven from the outer gear wheels H, preferably through the medium of a sprocket chain I passing around a sprocket wheel I' on the outer end of one of the hubs $h$ and around a sprocket wheel $I^2$ on the end of the cylinder or its shaft.

In the diagrammatic view, Fig. 3, the connecting rod between the plunger and planet wheel is represented as an ordinary connecting rod M pivotally connected with the plunger and planet wheel and it will be understood that this construction may be employed if so desired. With the construction described, it is obvious that if the plunger be held against movement, the planet wheels will simply rotate on their own axis, the internally toothed wheels will be rotated by the planet wheels and the measuring head will be rotated, but if the measuring head be held against movement the planet wheels will travel around their orbit and through the connecting rod reciprocate the plunger.

The machine is so constructed that it requires more power to move the measuring head than to reciprocate the plunger and consequently, if free from dough the head remains stationary and the plunger reciprocates. Under these conditions, if a batch of dough be placed in the hopper, a portion of it drops down in front of the plunger and is advanced into the compression box and against the measuring head. As the dough cannot escape save as removed by the measuring head the advance of the plunger will be arrested and the head will begin to rotate thereby bringing the measuring pockets or chambers successively into alinement with the compression chamber, where they will be filled and will gradually empty the compression chamber and allow the plunger to advance. As soon as all the dough is discharged the plunger is free to reciprocate while the measuring head will come to rest until another batch of dough is advanced into the compression chamber and the forward movement of the plunger again arrested, when the described measuring operation will be repeated.

Owing to the fact that the plunger is arrested in its movement by the dough and is held against movement so long as any dough remains in the compression chamber, the dough is not subjected to any manipulatian or working further than to sever a certain portion which drops down in front of the plunger, and to again sever portions therefrom which enter the measuring compartments. The arrangement is such that a minimum power is required to operate the machine and the pressure exerted by the plunger on the dough may be very accurately controlled through the resistance to the rotation of the measuring head. Should the amount of dough in the compression box be insufficient to fill the pockets in the measuring head, of course the plunger will not be arrested in its forward movement, but will make a complete excursion, permitting a new portion of the dough from the hopper to drop down in front of it and be advanced into the compression chamber between the hopper and measuring head.

Having thus described my invention, what I claim as new and desire to secure by Letters Patent of the United States, is:

1. In a dough divider, the combination with a movable measuring head having measuring compartments therein and a reciprocatory plunger for advancing the dough to said measuring head, of an epicyclic driving gear interposed between the plunger and measuring head, whereby when the movement of the plunger is arrested the measuring head will be moved and vice versa.

2. In a dough dividing machine, the combination with a movable measuring head having measuring chambers therein and a reciprocatory plunger for advancing the dough to said measuring head, of a rotary driving wheel, a planet wheel coöperating therewith, and a driven wheel coöperating with the planet wheel, said planet wheel and driven wheel being connected, the one with the plunger and the other with the measuring head; whereby upon the movement of either the measuring head or plunger being arrested the other will be operated.

3. In a dough dividing machine, the combination with a rotary measuring head having measuring chambers therein, and a reciprocatory plunger for advancing the dough to said measuring head, of a driving mechanism embodying a power driven sun wheel, a planet wheel in engagement therewith, and a concentric wheel with which the planet wheel engages, with driving connections between the wheel and measuring head and between the plunger and planet wheel, respectively, substantially as described.

4. In a dough dividing machine, the combination with the rotary measuring head having measuring chambers therein, reciprocatory plunger and compression chamber through which the dough is advanced by the plunger to the measuring head, of an epicyclic driving gear embodying sun and planet wheels, and a concentric wheel with which the planet wheel coöperates, a driving connection between the planet wheel and reciprocatory plunger and gearing between the concentric wheel and rotary head, whereby either the plunger or the head is free to move independently of the other.

5. In a dough dividing machine, the combination with the rotary measuring head having measuring chambers therein, reciprocatory plunger and compression chamber through which the dough is advanced by the plunger to the measuring head, of an epicyclic driving gearing having its different driven elements connected respectively with the plunger and measuring head, and means for rotating its driving element.

6. In a dough dividing machine, the combination with the rotary measuring head having measuring chambers therein, reciprocatory plunger and compression chamber through which the dough is advanced by the plunger to the measuring head, of a driving gearing embodying a power driven sun wheel, a planet wheel coöperating therewith and connected with the plunger, an internally toothed gear with which the planet wheel coöperates, and sprocket wheels and a chain connecting the internally toothed wheel and rotary measuring head.

7. In a dough dividing machine, the combination with a rotary measuring head having measuring chambers therein, a reciprocatory plunger, a compression chamber through which the dough is advanced by the plunger to the measuring head, of a driving gearing embodying an internally toothed gear connected with the measuring head for rotating the latter, a sun gear wheel journaled in the hub of the internally toothed gear wheel, a planet gear wheel meshing with the sun and internally toothed gear wheels, and a driving connection between the planet wheel and plunger.

8. In a dough dividing machine, the combination with the rotary measuring head having measuring chambers therein, reciprocatory plunger and compression chamber through which the dough is advanced by the plunger to the measuring head, of a driving gearing embodying an internally toothed gear wheel, a central sun wheel, a planet wheel in mesh with the sun and internally toothed wheels, a sprocket chain driving connection between the internally toothed wheel and measuring head, a connecting rod for the plunger, and a yoke on said connecting rod carrying a bearing for the planet wheel.

9. In a dough dividing machine, the combination with the frame, the compression chamber, the rotary measuring head journaled in the frame and having measuring chambers therein, and the reciprocatory plunger for advancing the dough through the compression chamber to the measuring head, of a driving gearing embodying oppositely disposed driving gear wheels, internally toothed gear wheels concentric with the driving gear wheels and having outwardly extending hubs journaled in the frame, said hubs forming the bearings for the driving gear wheels, planet wheels in mesh with the driving and internally toothed wheels, respectively, driving connections between said planet wheels and plunger, and driving connections between the internally toothed wheels and measuring head.

FRANK H. VAN HOUTEN, Jr.

Witnesses:
F. H. Van Houten,
C. Van Nostran.

Copies of this patent may be obtained for five cents each, by addressing the "Commissioner of Patents, Washington, D. C."